United States Patent
Wang

(10) Patent No.: US 11,867,260 B1
(45) Date of Patent: Jan. 9, 2024

(54) NUTATION REDUCER

(71) Applicant: Hong Jiang, Beijing (CN)

(72) Inventor: Xiaochun Wang, Beijing (CN)

(73) Assignee: Hong Jiang, Beijing (CN)

( * ) Notice: Subject to any disclaimer, the term of this patent is extended or adjusted under 35 U.S.C. 154(b) by 0 days.

(21) Appl. No.: 18/241,917

(22) Filed: Sep. 4, 2023

Related U.S. Application Data

(63) Continuation of application No. PCT/CN2022/136671, filed on Dec. 5, 2022.

(30) Foreign Application Priority Data

Dec. 22, 2021 (CN) .......................... 202111579029.6

(51) Int. Cl.
*F16H 1/32* (2006.01)
*F16H 55/10* (2006.01)

(52) U.S. Cl.
CPC ............. *F16H 1/321* (2013.01); *F16H 55/10* (2013.01)

(58) Field of Classification Search
CPC .................................. F16H 1/321; F16H 55/10
USPC ............................ 475/162, 163, 164; 310/82
See application file for complete search history.

(56) References Cited

U.S. PATENT DOCUMENTS

| | | | |
|---|---|---|---|
| 3,207,539 A | | 9/1965 | Hackforth |
| 3,341,725 A | * | 9/1967 | Gifford ................ H02K 41/065 310/78 |
| 3,539,847 A | * | 11/1970 | Gifford ................ H02K 41/065 310/82 |
| 3,590,659 A | * | 7/1971 | Maroth ................... F16H 23/00 475/164 |
| 3,935,750 A | | 2/1976 | Maroth |
| 4,620,457 A | * | 11/1986 | Distin ..................... F16H 1/321 475/168 |

(Continued)

FOREIGN PATENT DOCUMENTS

CN 2235046 Y 9/1996
CN 101038014 A 9/2007
(Continued)

OTHER PUBLICATIONS

Notice of Allowance of counterpart Chinese Patent Application No. 202111579029.6 dated Apr. 26, 2023.
(Continued)

*Primary Examiner* — Colby M Hansen

(57) ABSTRACT

A nutation reducer includes: a case, two pairs of nutation gear pairs, each pair being disposed in the case and composed of a nutation gear and non-nutation gear in engagement, and the non-nutation gear being fixed in the case or integrated formed in the case; an output shaft, rotationally disposed in the case; two annular spring films, each nutation gear of the gear pair is connected to the output shaft through one annular spring film; a nutation generating mechanism disposed in the case, two nutation gear pairs being respectively disposed on both sides of the nutation generating mechanism. Power-split arrangement is applied in this application, symmetric layout of the nutation gear pairs is adopted. In this way, the working efficiency of the reducer is obviously improved, meanwhile the volume and weight of the reducer, and the heat generated in working process are reduced, and power density is improved.

9 Claims, 13 Drawing Sheets

(56) References Cited

U.S. PATENT DOCUMENTS

| | | | | |
|---|---|---|---|---|
| 6,014,907 A | * | 1/2000 | Rilbe | ............... B41F 13/008 101/248 |
| 2015/0024896 A1 | | 1/2015 | Takahashi et al. | |

FOREIGN PATENT DOCUMENTS

| | | |
|---|---|---|
| CN | 104061251 A | 9/2014 |
| CN | 107614931 A | 1/2018 |
| CN | 110043609 A | 7/2019 |
| CN | 110285154 A | 9/2019 |
| CN | 111219447 A | 6/2020 |
| CN | 112096825 A | 12/2020 |
| CN | 113078773 A | 7/2021 |
| CN | 113183180 A | 7/2021 |
| CN | 114198460 A | 3/2022 |
| CN | 114198464 A | 3/2022 |
| CN | 114215844 A | 3/2022 |
| GB | 222443 A | 4/1925 |
| IN | 110836246 A | 2/2020 |
| JP | H06235445 A | 8/1994 |
| SU | 846855 A1 | 7/1981 |
| WO | 2021134846 A1 | 7/2021 |
| WO | 2021156149 A1 | 8/2021 |

OTHER PUBLICATIONS

1st Office Action of counterpart Chinese Patent Application No. 202111579029.6 dated Feb. 17, 2023.
2nd Office Action of counterpart Chinese Patent Application No. 202111579029.6 dated Apr. 12, 2023.
International Search Report of PCT Patent Application No. PCT/CN2022/136671 dated Feb. 22, 2023.

* cited by examiner

NUTATION REDUCER

CROSS REFERENCE TO RELATED APPLICATIONS

The present application is a Continuation Application of PCT Application No. PCT/CN2022/136671 filed on Dec. 5, 2022, which claims the benefit of Chinese Patent Application No. 202111579029.6 filed on Dec. 22, 2021. All the above are hereby incorporated by reference in their entirety.

FIELD OF INVENTION The present application relates to the field of reducers, and specially a nutation reducer.

BACKGROUND

High transmission ratio reducers with are widely used in automatic field. Commonly used high transmission ratio reducers comprise: worm pair typed reducers, multi-stage planetary gear typed reducers, harmonic reducers and RV reducers. The efficiency of worm pair type reducers is low, generally less than 50%; since the required power of an electric motor is output power divided by the transmission efficiency, the required power of the electric motor will obviously increase, not only the volume and weight being increased, but also the extra energy consumption transmitting to heat by the electric motor and reducer, accelerating the temperature of the equipment rising, thus this type of reducer is not suitable for continuous or frequent operation under heavy load. Transmission efficiency of planetary reducer is rather high, and unit output torque is also good, but the transmission ratio of single-stage planetary reducer is low. For the application fields where high transmission ratio is required, multi-stage planetary series reducers have relatively larger volume, and moreover the requirement for the art to manufacture planetary reducers with low backlash is rather high, thus the cost is high, being difficult for mass production. For the situation where high-power density and low backlash are necessary, such as industrial robot, mechanical arm and manipulator used in automatic equipment, at present mainly harmonic and RV reducers are chosen to be applied. However, both of the two kind of reducers also have some defects: the power density of the harmonic reducer is not so good as that of the RV reducer, but after all small specification harmonic reducer is easier to manufacture; on the other hand, even if the power density of the RV reducer is better, no small specification products is available. Existing nutation reducers adopt a joint bearing to realize nutation movement, and its structure is complicate, its volume being lager; based on existing structure, if the output torque to be doubled, its volume should also be doubled, so the application fields are limited. Meanwhile, since the mechanical efficiency and power density of the joint bearing is relatively lower, its application is also limited for the fields where large output torque and small volume are required.

SUMMARY

In view of this, a nutation reducer is provided to solve the existing problems caused by adoption of the joint bearing to realize nutation movement of being complicate in structure, large volume, and low power density.

To achieve the purpose mentioned above, technical solutions are provided as follows.

In a first aspect, the present disclosure provides a nutation reducer, comprising a case; two pairs of nutation gear pairs provided in said case, wherein each said nutation gear pair is composed of a nutation gear and a non-nutation gear in meshing engagement, and said non-nutation gear is provided in said case in a fixed manner, or integrally formed with said case, wherein in each said nutation gear pair, a number of teeth of the nutation gear is one more than a number of teeth of the non-nutation gear; an output shaft of the reducer which is rotationally provided in said case; two annular pre-stretched spring films, each of which includes an inner, outer rings, and an annular elastic portion which is connected between the inner and outer rings, wherein reamed holes are distributed circumferentially in both the inner and outer rings, and each nutation gear is fixed to the outer ring of the said spring film by first hinged bolts which pass through the reamed holes in said outer rings and fit with the reamed holes; said output shaft is fixed to the inner rings of said spring film by second hinged bolts which pass through the reamed holds in said inner rings and fit with the reamed holes; when said nutation gear performs nutation movement, said annular spring film transforms the nutation movement of said nutation gear into single rotary movement of said output shaft by means of an elastic deformation of the annular elastic portion; and a nutation generating mechanism which is provided in said case, wherein two nutation gear pairs are symmetrically provided on two opposite sides of said nutation generating mechanism, and said nutation generating mechanism drives said nutation gears to perform the nutation movement, such that the teeth of the nutation gear roll on the teeth of the non-nutation gear.

Further optionally, said nutation generating mechanism includes a tilted disc rotationally provided in said case on said output shaft of the reducer, wherein two tilted planes are symmetrically formed on both sides of said tilted disc, and said tilted disc is driven by a driving mechanism; and a planar high-density ball bearing which is provided on each side of said tilted disc, wherein each side of the tilted disc and a back side of each nutation gear serve as raceways of said high-density ball bearing; wherein two said nutation gears of two said nutation gear pairs have the same number of teeth, and two said non-nutation gears of two said nutation gear pairs have the same number of teeth; and when said tilted disc rotates, the tilted planes on both sides of the tilted disc drive the nutation gears to perform the nutation movement, such that the teeth of said nutation gears roll on the teeth of said non-nutation gears.

Further optionally, said inner ring of the spring film is coaxially provided with said output shaft which is connected with the inner ring, and said outer ring of the spring film is coaxially provided with said nutation gears which is connected with the outer ring, the axis of said inner ring intersecting with the axis of said outer ring.

Further optionally, said annular elastic portion takes a form of an annular bulge, which is convex in one side and concave in the other side; said inner ring is tangent to an inner periphery of the elastic portion, while said outer ring is tangent to an outer periphery of the elastic portion.

Further optionally, a concave and convex surfaces of said bulge are an annular ripple bulge formed by a circular arc camber, a spline surface or a cosine surface.

Further optionally, an opening is made in a side of the said tilted disc that the tilted disc has a larger thickness to get dynamic balance when the tilted disc rotates.

Further optionally, said driving mechanism is an electric motor, which directly drives said tilted disc.

Further optionally, said case serves as a case of said electric motor, wherein a stator of said motor is provided in said case, and/or there is a neck contraction segment between the two tilted planes of said tilted disc, wherein said neck contraction segment serves as a rotor of said electric motor.

Further optionally, said driving mechanism includes both the electric motor and a transmission mechanism, wherein said electric motor drives said tilted disc through the transmission mechanism.

Further optionally, said transmission mechanism includes a chain and a chain wheel, wherein uniformly distributed chain-wheel teeth are formed in a circumference of said tilted disc, and the chain wheel is fixed to the shaft of said electric motor, and is connected to chain-wheel teeth of said tilted disc through the chain.

Further optionally, said transmission mechanism includes a transmission gear, and uniformly distributed gear teeth are formed in a circumference of said tilted disc, wherein a gear is fixed to a shaft of the electric motor, and is in meshing engagement with the gear teeth of the tilted disc.

Beneficial effect: power-split layout is enforced on both sides of the nutation generating mechanism in this application, especially the tilted disc is adopted for power-split layout, and in comparison with a non-power-split nutation reducer, at the cost of the thickness (axial) increased by 30-40%, the output torque can be increased by about 100%; and for a single-stage reducer, if the transmission ratio reaches about 160, the reduced friction loss will be about one half of the friction loss between tooth surfaces, which can obviously improve its working efficiency. Meanwhile the volume, weight and equipment heating of the reducer are reduced, under the condition of the same temperature rise, power density can be increased.

BRIEF DESCRIPTION OF DRAWINGS

The above and other objects, features and advantages of the present disclosure will become more apparent by a detailed description of exemplary embodiments thereof with reference to the accompanying drawings. The accompanying drawings described below are only a part of embodiments of the present disclosure, and other drawings may be obvious to an ordinary skilled person in the art based on these drawings.

Figure 13:
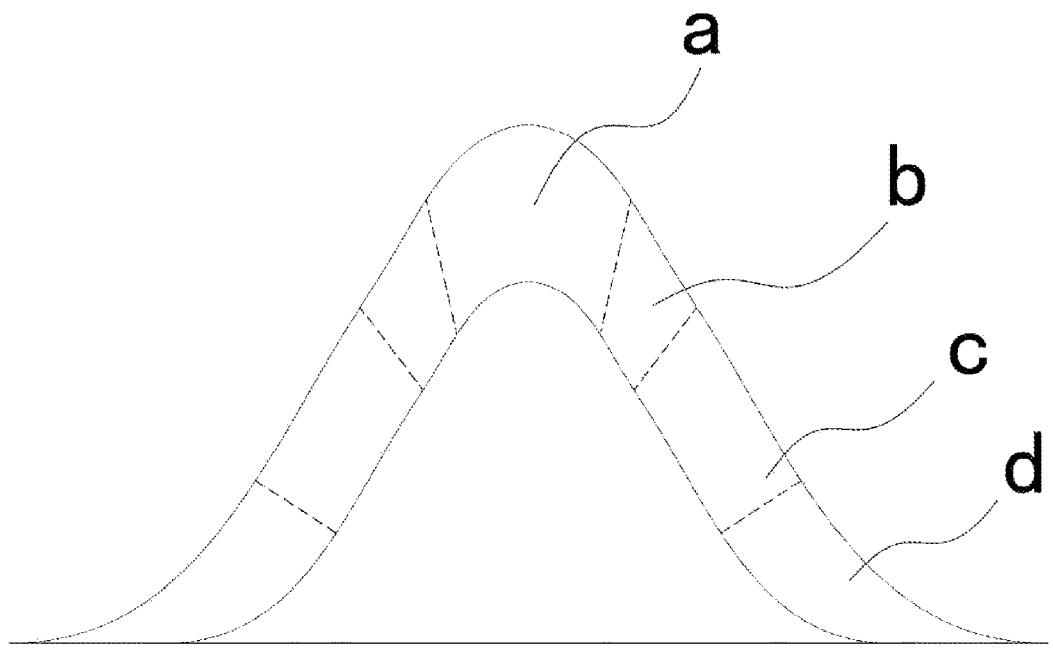
FIG. 13 is a front view of a single tooth of the nutation gear in FIG. 12.
Figure 14:
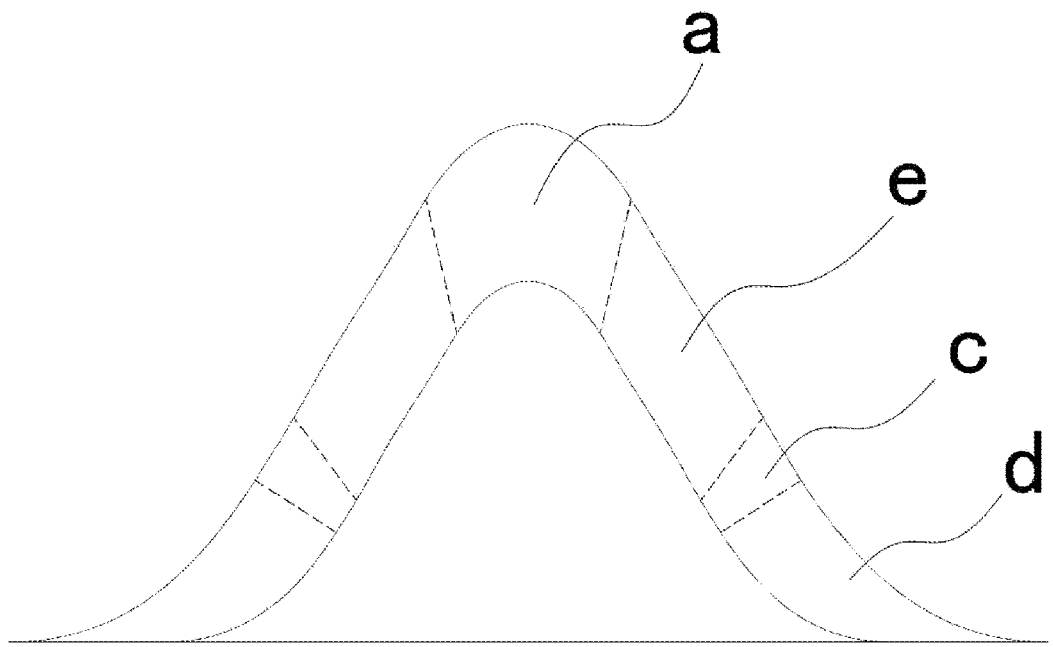
FIG. 14 shows a front view of a single tooth of the non-nutation gear in Embodiments 1, 2 and 3 of the present disclosure.
Figure 15:
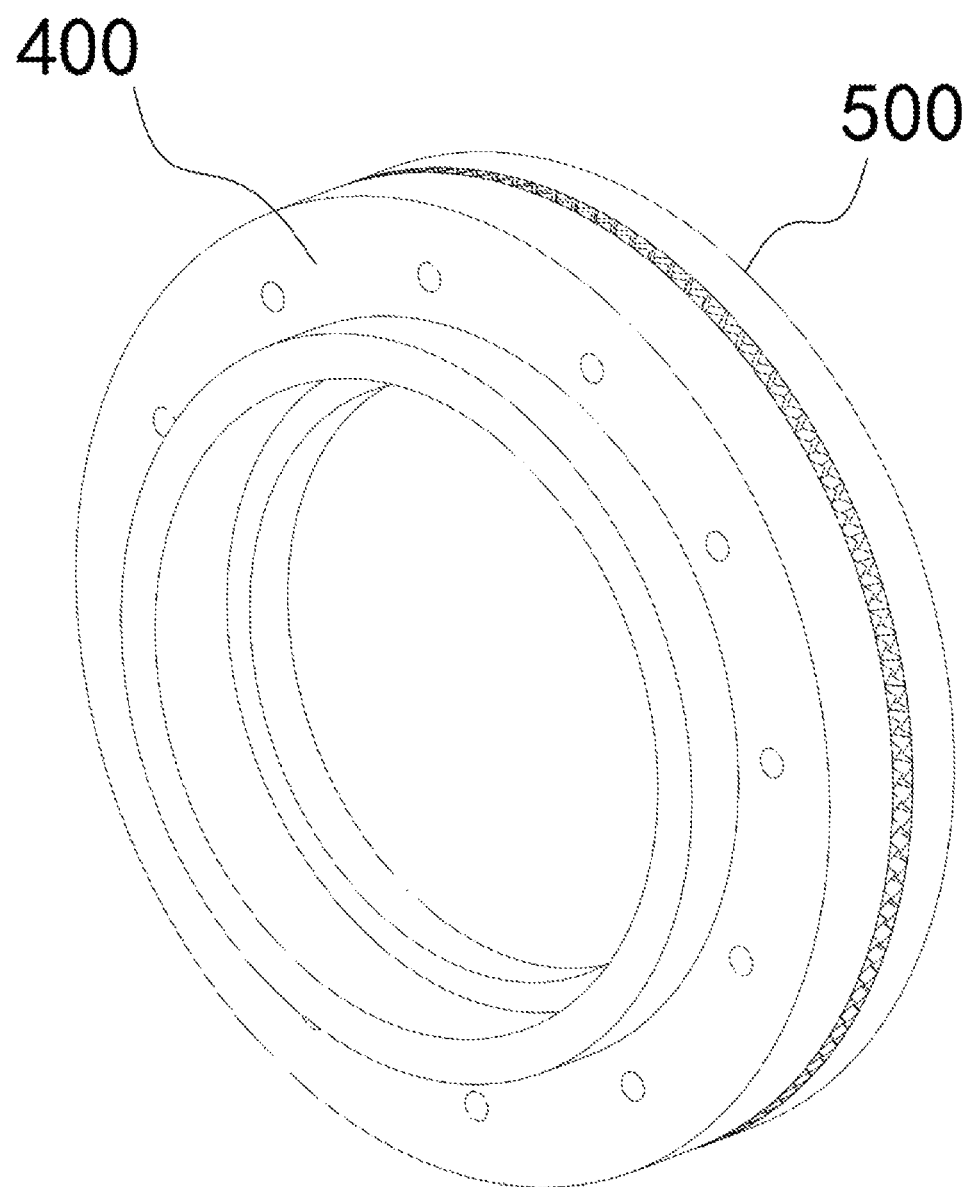
FIG. 15 shows a schematic diagram of the nutation gear pair in meshing engagement in Embodiments 1, 2 and 3 of the present disclosure.

The dotted lines in FIG. 13 and FIG. 14 are the imaginary lines, which are added for purpose of illustrating the construction components of the tooth profile.

List of Reference Signs:
101-inner ring; 102-outer ring; 103-elastic portion; 200-planar high-density ball bearing; 201-cage; 202-ball; 300-case; 301-output shaft of the reducer; 3011-first output shaft of the reducer; 3012-second output shaft of the reducer; 400-nutation gear; 500-non-nutation gear; 600-tilted disc; 601-tilted plane; 610-neck contraction segment; 620-driving electric motor; 631-first transmission shaft; 632-second transmission shaft; 633-herringbone gear; 634-helical gear; 635-cylindrical gear; 900-electric motor; 901-rotor; 902-stator; 903-first annular spring film; 904-second bearing; a-gear tip surface; b-elliptic cone; c-plane; d-gear root surface; e-non-instantaneous-pole enveloping tooth surface;

DETAILED DESCRIPTION OF INVENTION

In order to make the purpose, technical solutions and advantages of the embodiments of the present disclosure clearer, the technical solutions in the embodiments of the present disclosure will be described clearly and completely below in conjunction with the accompanying drawings of the embodiments of the present disclosure, and it is obvious that the described embodiments are a part of the embodiments of the present disclosure, rather than all of them. Based on the embodiments of the present disclosure, all other embodiments which may be obvious to an ordinary skilled person in the art will fall within the scope of protection of the present disclosure.

The terms as used herein are solely for the purpose of describing particular embodiments and are not intended to limit the present disclosure. The singular forms of "a", "an", "said" and "the" as used in the specification and the appended claims are also intended to include plural forms, unless the context clearly indicates otherwise. Unless the context clearly indicates otherwise, "a plurality of" generally includes at least two, but does not exclude at least one.

It should be understood that the term "and/or" as used herein is simply a description of the relationship of the associated items, indicating that three relationships can be comprised, for example, A and/or B can mean: A alone, both A and B, and B alone. In addition, the character "/" herein generally indicates that the item therebefore and the item thereafter are in an "or" relationship.

It should also be noted that the term "include," "comprise," or any other variation thereof is intended to cover non-exclusive inclusion, such that a product or system that includes a set of elements includes not only those elements, but also other elements not explicitly indicated, or also other elements that are inherently included in the product or system. Unless stated otherwise, an element qualified by the statement "comprise a . . . " does not preclude the existence of additional identical elements in the product or system including said element.

The existed nutation reducer adopts a joint bearing to realize nutation movement, such that its structure is complicate, its volume is larger, and if its output torque is doubled, its volume should nearly be doubled either, so its application fields are limited; meanwhile adopting the joint bearing leads to a lower mechanical efficiency.

The present disclosure adopts two pairs of nutation gear pair, being symmetrically provided on two opposite sides of the nutation generating mechanism, such that the structure is simplified. In comparison with the prior art, for the same output torque, the volume of the nutation reducer can be reduced, especially for the application of power-split layout based on tilted disc, if the output torque wants to be doubled, the volume only needs to increase 30%-40%; on the other hand, the existed nutation reducer is complicated due to adopting a complicate joint bearing, its volume should nearly be doubled. The present disclosure can not only increase the output torque, but also can reduce equipment weight and heating amount, improve mechanical efficiency and power density.

To make a further exposition of the technical proposal in this disclosure, embodiments as follows are presented in reference to FIG. 1 to FIG. 15.

Embodiment 1

A nutation reducer is provided in this embodiment, and as illustrated in FIG. 1, and FIGS. 4-9, the nutation reducer comprises: a case 300; two nutation gear pairs which are provided in the case 300, wherein each nutation gear pair is composed of a nutation gear 400 and a non-nutation gear 500 in meshing engagement, wherein the non-nutation gear 500 is provided within the case 300 in a fixed manner or integrally formed with the case 300, and for each nutation gear pair, the number of teeth in the nutation gear 400 is one more than that in the non-nutation gear 500; an output shaft 301 of the reducer which is rotationally provided in the case 300; two pre-stretched annular spring films, wherein each annular spring film comprises an inner ring 101, an outer ring 102, and an annular elastic portion connected between said inner ring 101 and said outer ring 102, and some reamed holes are circumferentially formed in the inner ring 101 and the outer ring 102, and wherein the nutation gear in each nutation gear pair is fixed to the outer ring 102 by the first hinged bolts which pass through the reamed holds in the outer ring and fit with the reamed holes, and the output shaft 301 of the reducer is fixed to the inner ring 102 by the second hinged bolts which pass through the reamed holes in the inner ring and fit with the reamed holes; when said nutation gears perform the nutation movement, the annular elastic portion 103 in said annular spring film will transform the nutation movement of said nutation gears into single rotary movement of said output shaft by means of an elastic deformation of the annular elastic portion; an nutation generating mechanism which is provided in the case 300, wherein two nutation gear pairs are symmetrically provided on opposite sides of the nutation generating mechanism, and the nutation generating mechanism drives the nutation gears 400 to perform the nutation movement, so as to make the teeth of the nutation gear 400 roll on the teeth of the non-nutation gear 500.

In this embodiment, the spring film realizes a radial locating function and a torque transmission through the first and second hinged bolts fitting with the reamed holes formed in the outer and inner rings. Preferably, the first hinged bolts fit the reamed holes formed in the outer ring with clearance, and the second hinged bolts fit the reamed holes formed in the inner ring with clearance.

What needs to be specially explained is that, in this embodiment, the teeth of the nutation gear 400 and of the non-nutation gear 500 are respectively formed on an end face of the gear discs, and the teeth individually extends in a radial direction, where their individual longitudinal cross-section area gradually get bigger from the tooth crest towards the dedendum, and their individual cross-sectional area gradually get smaller from the outer side towards the inner side. The tooth width means the distance from the inner circumferential end face of the gear to outer circumferential end face of the same.

Optionally, for both the nutation gear 400 and the non-nutation gear 500, the teeth are respectively distributed on an end face of the gear disc, and a width direction of the teeth of the nutation gear 400 is just the same of a radial direction of the nutation gear 400, while a width direction of the teeth of the non-nutation gear 500 is just the same of a radial direction of the non-nutation gear 500.

Preferably, as illustrated in FIGS. 12, 13, 14, and 15, a working tooth surface 401 of the nutation gear 400 is composed of an elliptic cone b that is outwardly convex, and in the same cross section, the distance between the highest point and lowest point of the elliptic cone b will gradually reduce along the radial direction of the nutation gear 400 from the outer side towards the inner side. A working tooth surface 501 of the non-nutation gear 500 is a non-instantaneous-pole enveloping surface segment, generated during the nutation movement. The tooth surface of the nutation gear 400 is composed of a gear tip surface a, an elliptic cone b, a plane c, and a gear root surface d, wherein the elliptic cone b, the plane c and the gear root surface d are successively arranged at both ends of the gear tip surface a, and every adjacent two of the gear tip surface a, the elliptic cone b, the plane c and the gear root surface d are tangent to each other; and wherein the gear tip surface a is a smoothly convex surface, and the gear root surface d is a smoothly concave surface. The tooth surface of the non-nutation gear 500 is composed of a gear tip surface a, a non-instantaneous-pole enveloping tooth surface e, a plane c and a gear root surface d, wherein the non-instantaneous-pole enveloping tooth surface e, the plane c and the gear root surface d are successively arranged at both ends of the gear tip surface a, and every adjacent two of the gear tip surface a, the non-instantaneous-pole enveloping tooth surface e, the plane c and the gear root surface d are tangent to each other; and wherein the gear tip surface a is a smoothly convex surface, and the gear root surface d is a smoothly concave surface. The gear tip surface a of the nutation gear 400 and the gear tip surface a of the non-nutation gear 500 respectively are smoothly convex surfaces, and the gear root surface d of the nutation gear 400 and the gear root surface d of the non-nutation gear 500 respectively are smoothly concave surfaces. This layout can satisfy the bearing capacity of the nutation gear 400 in forward and reverse rotation. Optionally, for the nutation gear 400, the elliptic cones b, the planes c, and the gear root surfaces d on both ends of the gear tip surface a of the nutation gear 400 are symmetrically arranged. Similarly, for the non-nutation gear 500, the non-instantaneous-pole enveloping surfaces e, the planes c and the gear root surfaces d on both ends of the gear tip surface a are symmetrically arranged.

However, too small shaft angle will disadvantageously affect the string and strain state of the annular spring film 103, which is used as the output mechanism of the reducer. As a result, the shaft angle has to be less than 180° to realize the nutation movement. On the other hand, the upper limit of the tooth number is constrained by the transmission efficiency of the reducer mechanism, because the larger transmission ratio leads to the smaller transmission efficiency. For this embodiment, the shaft angle T between the nutation gear 400 and the non-nutation gear 500 lies in a range of 177°≤T<180°.

In this embodiment, the working tooth surface of the nutation gear is provided as an elliptic cone, and in the same cross section, the distance between the highest point and lowest point of the elliptic cone gradually reduces along the radial direction of the nutation gear from the outer side towards the inner side. By means of adopting an elliptic cone instead of a circular cone as the working tooth surface of the nutation gear, the arc length of gear working surface of a pin gear is obviously increased. For the same gear diameter, gear ratio and output load, the length of the working tooth surface on the pin gear can be increased by about 60%, so that the local wear in the tooth surface of the pin gear is suppressed, and its service life is increased. Further, in comparison with an end face cycloid pin gear pair, for the gear pairs of the same gear diameter, gear ratio and gear load, the contact stress between tooth surfaces will be lowered by 23%, or under the same contact stress, the load capacity can be increased by about 30%.

Further optionally, the nutation generating mechanism comprises: a tilted disc 600, which is rotationally provided on the output shaft 301 in the case 300, wherein two opposite sides of the tilted disc 600 are provided with a pair of symmetric tilted planes 601, and the tilted disc 600 is driven by a driving mechanism to rotate; planar high-density ball bearings 200, which are respectively provided between the tilted disc 600 and the nutation gears 400 of each nutation gear pair, and two sides of the tilted disc 600 and the back sides of each nutation gear 400 of the two nutation gear pairs serve as the raceways of the planar high-density ball bearings 200. Two nutation gears 400 of the two nutation gear pairs have the same number of teeth, and two non-nutation gears 500 of the two nutation gear pairs have the same number of teeth. When the tilted disc 600 rotates, the tilted planes 601 formed on both sides of the tilted disc 600 drives the nutation gears 400 to perform the nutation movement, causing the teeth of the nutation gear 400 to roll on the teeth of the non-nutation gear 500. The two non-nutation gear 500 of the two nutation gear pairs have the same number of teeth, so as to insure the same output speed, the same nutation angle between the two nutation gears, such that a same tilted disc 600 can drive two nutation gears 400 to perform the nutation movement at the same time; meanwhile the problem of unbalanced thrust on both sides of the tilted disc 600 is solved, and thus the axis of the tilted plate 600 is kept coaxial with the axis of the output shaft of the reducer.

Figure 9:
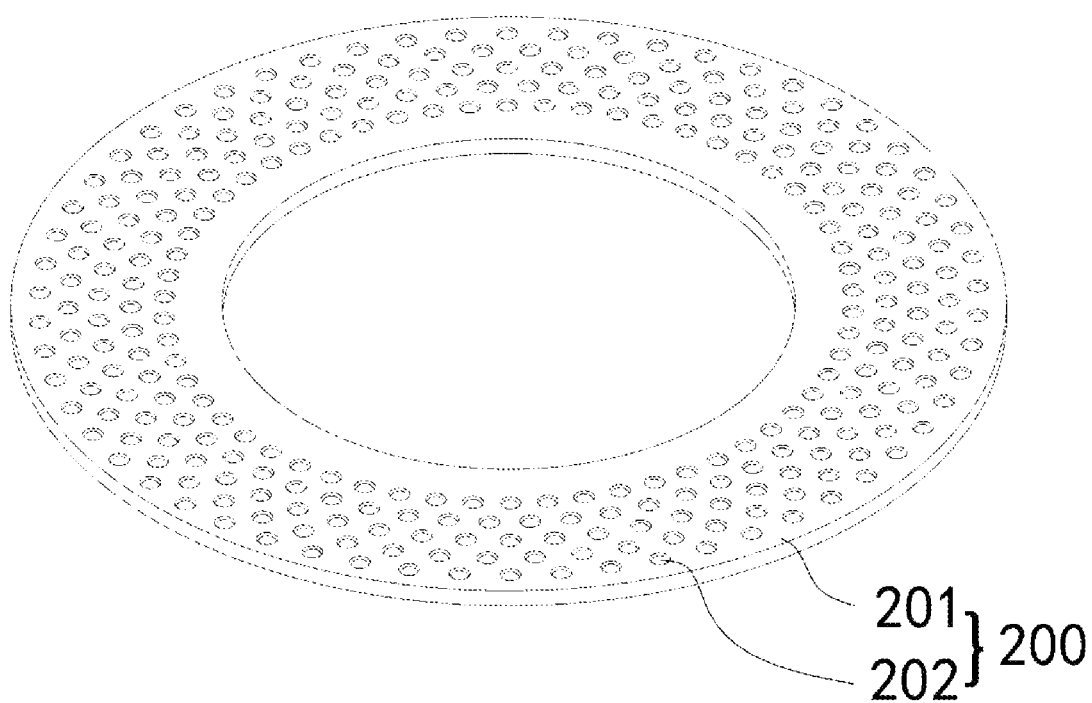
FIG. 9 shows an isometric drawing of the planar high-density ball bearing used in the nutation reducer in Embodiments 1, 2 and 3 of the present disclosure.

As illustrated in FIG. 9, the planar high-density ball bearing 200 in this embodiment comprises: a cage 201 provided with multi-group ball holes, each group of which a ball 202 is provided in, protruding out of both sides of the cage, and each group of which distribute in an elliptic track of different radius, being arranged around the whole ellipse, wherein the major axes of multiple elliptic tracks where the multi-group ball holes are provided coincide with a same straight line, and the centers of the elliptic tracks coincide with each other, and the ball holes in adjacent groups are arranged in a staggered pattern. In this embodiment, the distance between each ball hole in any group and a ball hole in a closest adjacent group of ball holes is less than two times of the ball diameter to get a high-density arrangement of the balls. What needs to be specially emphasized is that, the ball holes are possible to be arranged in circles in this embodiment, however, the optimum scheme is to be arranged in an elliptic track, so as to avoid earlier fatigue pitting.

In this embodiment, two nutation gear pairs are symmetrically provided and are arranged at two opposite sides of the tilted disc 600, and two tilted planes 601 are symmetrically formed on two opposite sides of the tilted disc 600. In this way, when the tilted disc 600 rotates, two nutation gears 400 synchronously perform the nutation movement, and the same output shaft of the reducer is used to transmit the output torque from the two nutation gears 400, thereby enabling the friction loss between the cage of the thrust bearing and the nutation gears 400, and the cage of the thrust bearing and the tilted disc, under the same output power, to reduce 50%, and their values to be about the transmission ratio multiply 0.0005. For a nutation reducer with a single stage transmission ratio reaching about 160, the decreased friction loss is nearly one half of the friction loss between tooth surfaces, and thus working efficiency of the nutation reducer in this embodiment is obviously improved.

Figure 1:
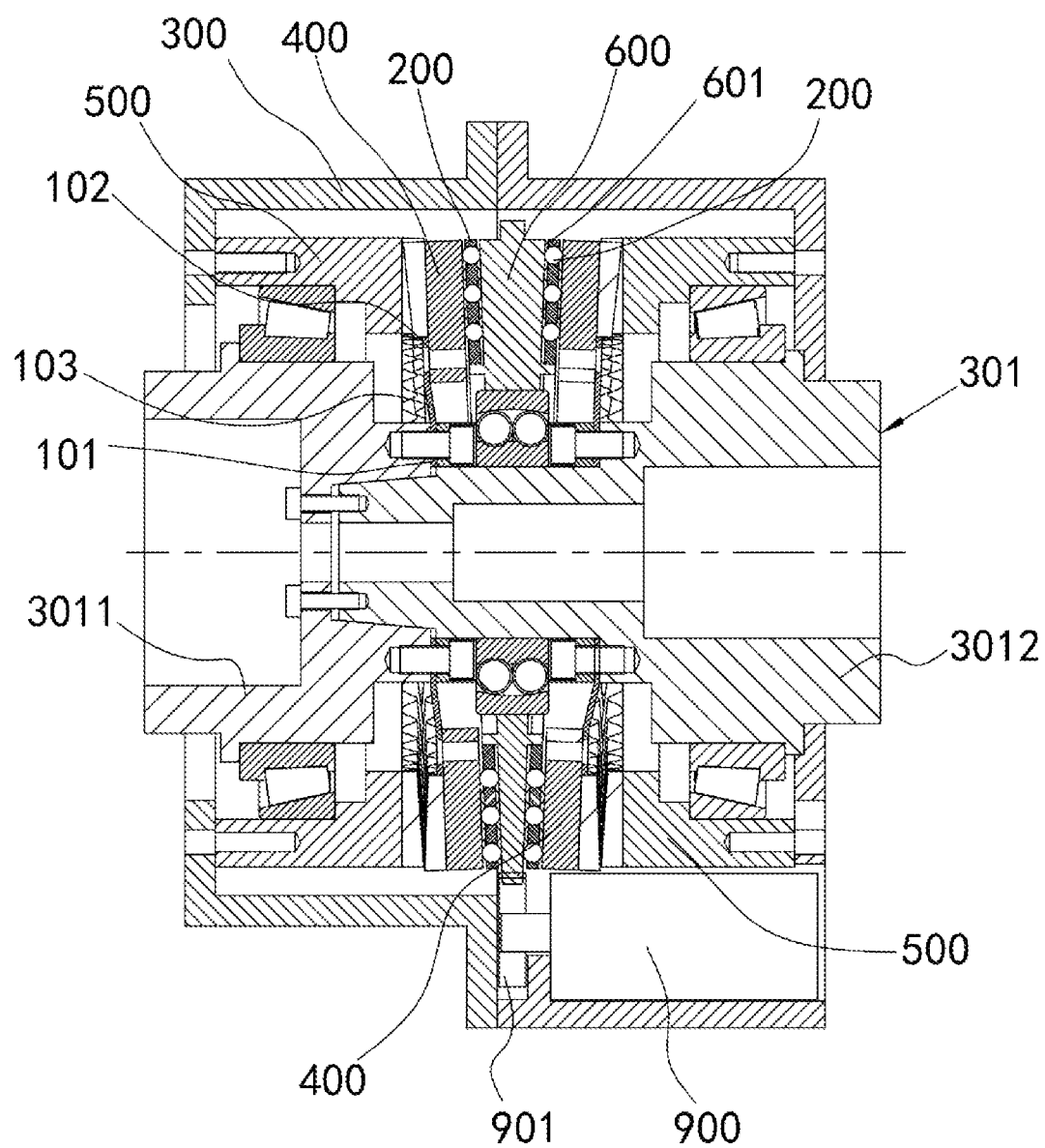
FIG. 1 shows a schematic diagram of the integral structure of a nutation reducer according to Embodiment 1 of the present disclosure.
Figure 6:
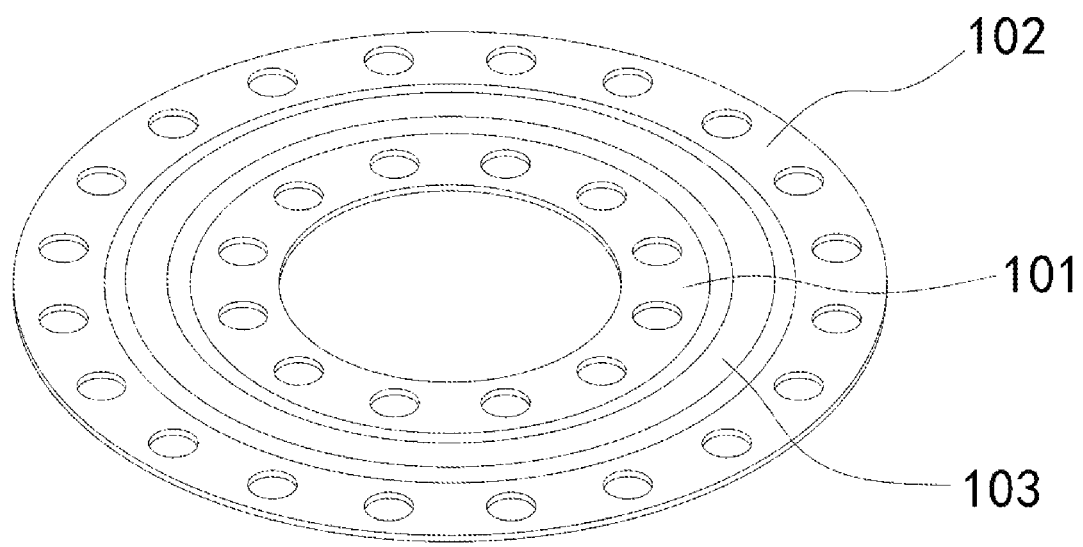
FIG. 6 shows an isometric drawing of the pre-stretched annular spring film used in Embodiments 1, 2 and 3 of the present disclosure.
Figure 11:
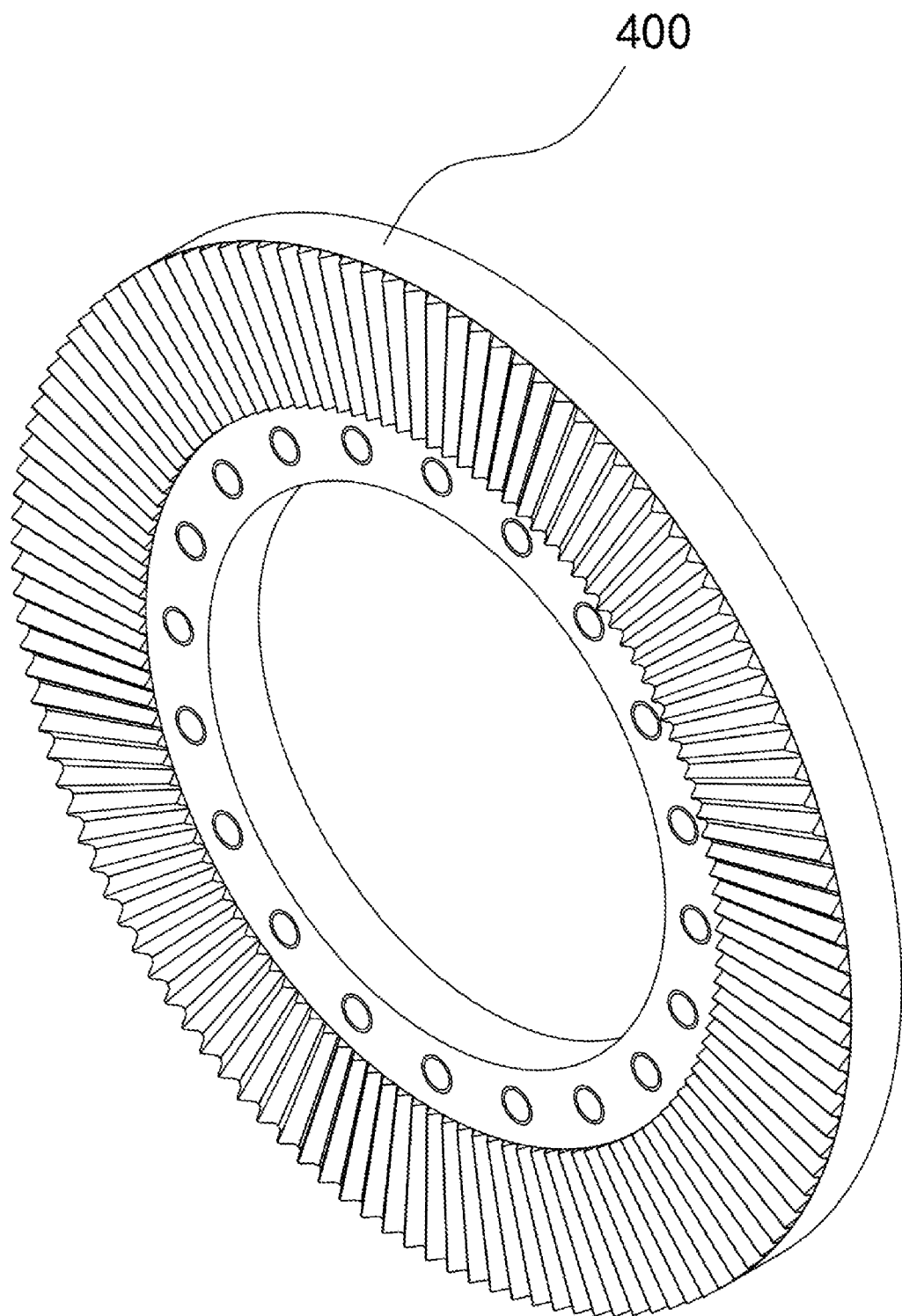
FIG. 11 is an isometric drawing of a nutation gear of the nutation reducer in Embodiment 1, 2 and 3 of the present disclosure.
Figure 12:
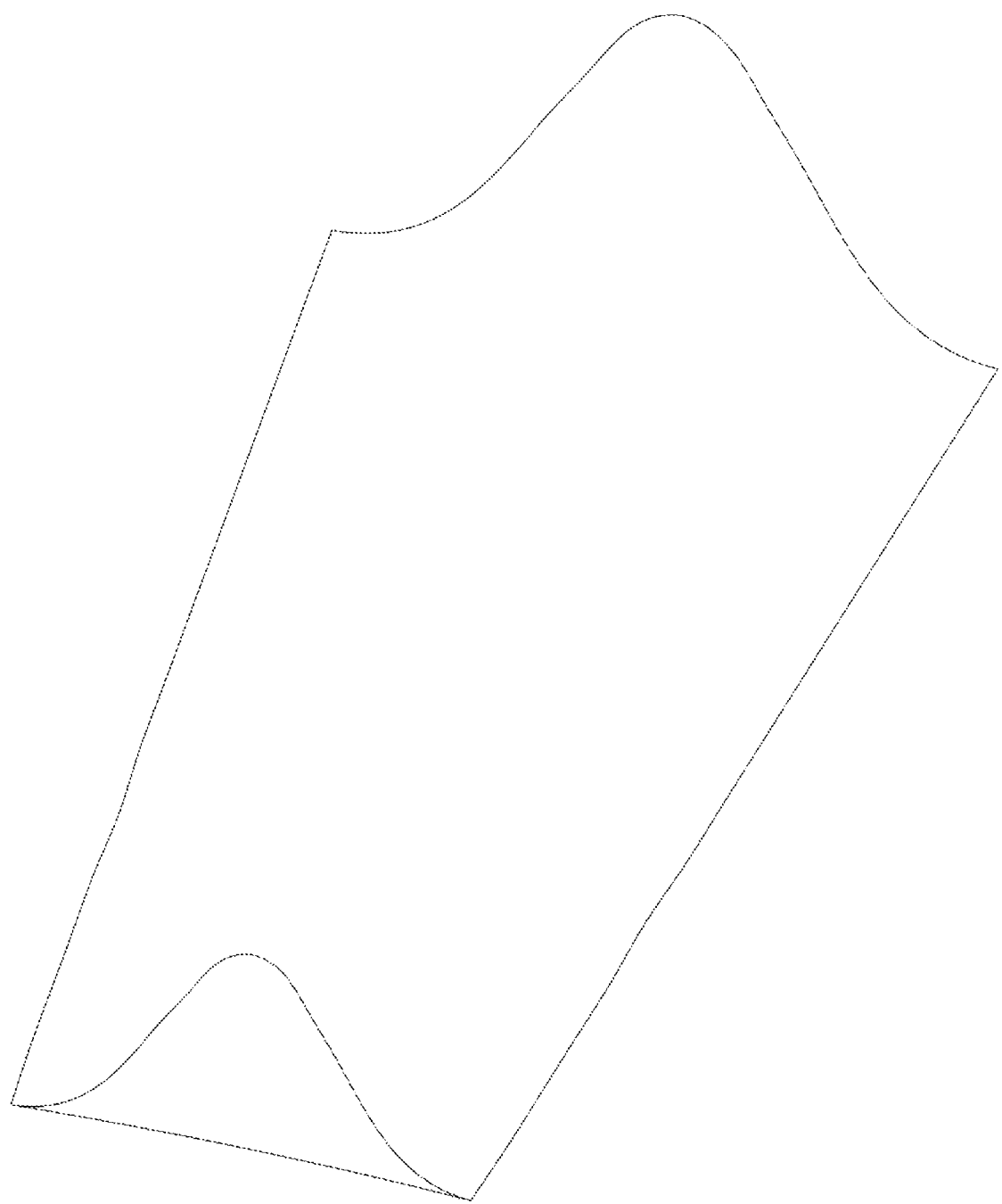
FIG. 12 is an isometric diagram of a single tooth of the nutation gear in FIG. 11.

Further preferably, as illustrated in FIGS. 1, 6 and 11, the inner ring 101 and said output shaft 301 of the reducer, which is fixed to the inner ring 101, are coaxially disposed, while the outer ring 102 and said nutation gear 400, which is fixed to the outer ring 102, are coaxially disposed, wherein the axes of the inner ring and outer ring intersect with each other. When said nutation gear 400 performs the nutation movement, said annular spring film generates an elastic deformation to adapt the nutation movement of the nutation gear 400, meanwhile the spring film forces the output shaft to output a single rotary motion. Optionally, the inner ring 101 and the outer ring 102 individually form flanges, the flange composed of the inner ring 101 acts as a first connecting part, while the flange composed of the outer ring 102 acts as a second connecting part; the inner ring is fixed to the output shaft 301 by hinged bolts, and the outer ring is fixed to the nutation gear 400 by hinged bolts. In this embodiment, the nutation movement of the nutation gear 400 is transformed into single rotary movement of the output shaft, and adopting the spring film does not lead to a theoretic kinematic error, whereby the output rotary angle transmitted to the output shaft is strictly equal to the spinning angle of the nutation gear 400, and at any rotary angle, the rigidity of the output mechanism is constant, which does not lead to an angular fluctuation error in output. The next is that there is almost no energy loss, no extra heat generated. Further, the spring film serves as the function of a joint bearing, no extra bearings being necessary. In this way, the annular spring film itself can take the radial force from the nutation gear 400, and the centering function of the nutation gear 400 is realized. In comparison with a traditional nutation reducer adopting a joint bearing, the structure is more compact, the inner space of the reducer is reduced, and for the same output torque, the volume of the reducer is smaller, which enables the reducer to be suitable for even wider application fields.

Figure 7:
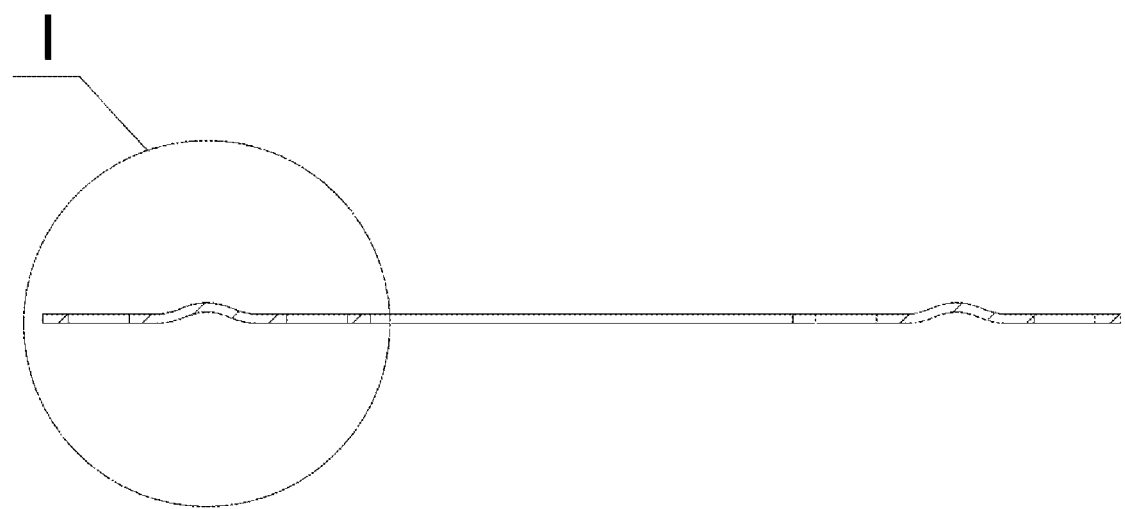
FIG. 7 is a cross-section view of the pre-stretched annular spring film in FIG. 6.
Figure 8:
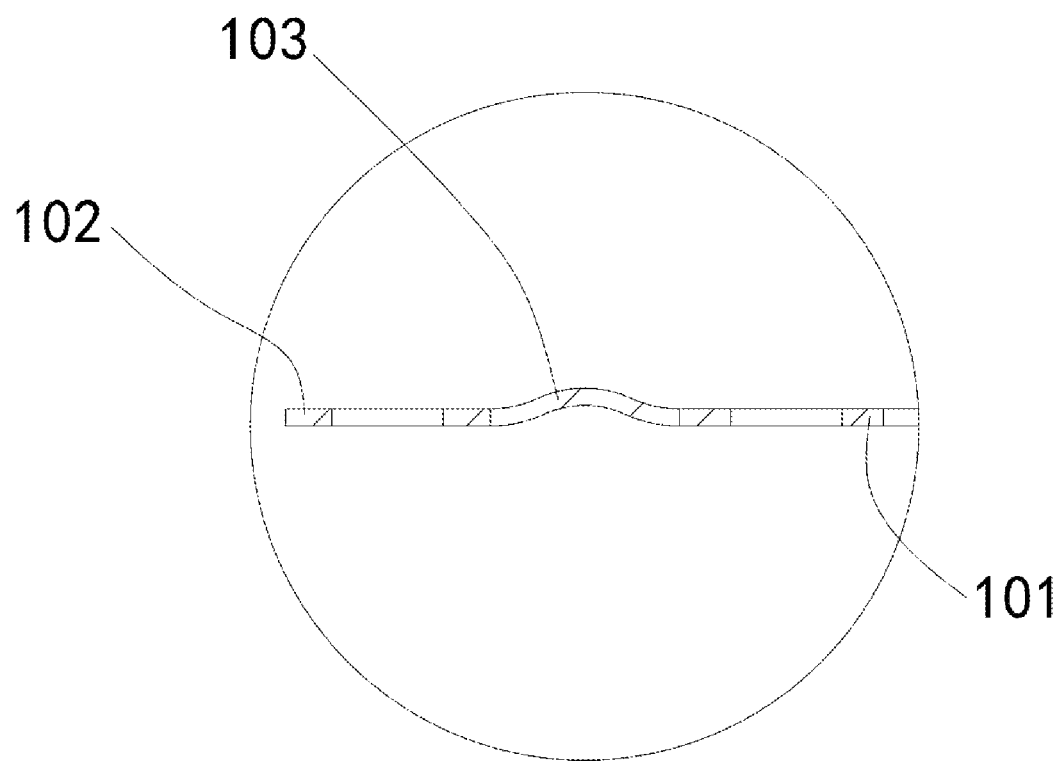
FIG. 8 is a local amplification diagram at I in FIG. 7.

Further, as illustrated in FIG. 6 to FIG. 8, the annular elastic portion 103 is an annular bulge with one side being convex and the other side being concave, wherein said inner ring is tangent to the inner periphery of the annular elastic portion 103, while said outer ring 102 is tangent to the outer periphery of the annular elastic portion 103. Further, the convex and concave surfaces of the bulge are formed by a circular arc camber, a spline surface or a cosine surface. The pre-stretched amount of the tension deformation of the annular spring film to be compensated in an assembling process can obviously reduce the erection stress in spring film caused by the tensile deformation due to the installation, significantly decrease the erection stress in annular spring film. Suitable pre-stretching is almost not possible to reduce the radial rigidity of the annular spring film, however, an overlarge pre-stretching amount may reduce its radial rigidity, or even leads to elastic instability.

What needs to be specially explained is that, in this embodiment, the intersection between the axes of the inner ring 101 and that of the outer ring 102 refers to the status of the spring film after installation. Since the spring film after installation must adapt the shaft angle between the nutation gear 400 and the non-nutation gear 500 which is less than 180°, a deformation appears in the annular elastic portion after installation. Under its natural situation (the status before installation, no deformation in the elastic portion appears), the axis of inner ring 101 is coaxial with the axis of outer ring 102. After installation, since a certain deflection angle appears between the inner ring 101 and outer ring 102, local bulge in the annular elastic portion be straightened.

Specifically, as shown in FIG. 1, the output shaft 301 comprise two parts, a first output shaft 3011 and a second output shaft 3012, and bearing mounting bores are formed in the back sides of the non-nutation gears 500, in which taper roller bearings are provided. The first output shaft 3011 is provided in the cone of the taper roller bearing, and the second output shaft 3012 is provided in the case through the taper roller bearing. Both the first output shaft 3011 and the second output shaft 3012 have conical surfaces, wherein the axes of the conical surface respectively coincide with the axes where they locate. The first output shaft 3011 and the second output shaft 3012 fittingly engage with each other through the conical surfaces and then are fixed together by bolts, making the first output shaft 3011 and the second output shaft 3012 rotate with the same phase like a rigid shaft. The axial thrust on both the first and second output shafts caused by the nutation gears in their nutation movement are repealed with each other, and torque can be transmitted from one output shaft to the other, to keep the output movement with phase synchronization. The tilted disc 600 is rotatably provided on the output shaft through a bearing which can be a self-aligning bearing.

Preferably, the case 300 may be composed of two parts, i.e. a first case part and a second case part, both of which are fastened together to form an inner accommodation space, and the non-nutation gear in one nutation gear pair is fixed to or integrally formed with the first case part, while the non-nutation gear in the other nutation gear pair is fixed to or integrally formed with the second case part. The two non-nutation gears in the two nutation gear pairs are coaxial with each other.

Embodiment 2

Figure 2:
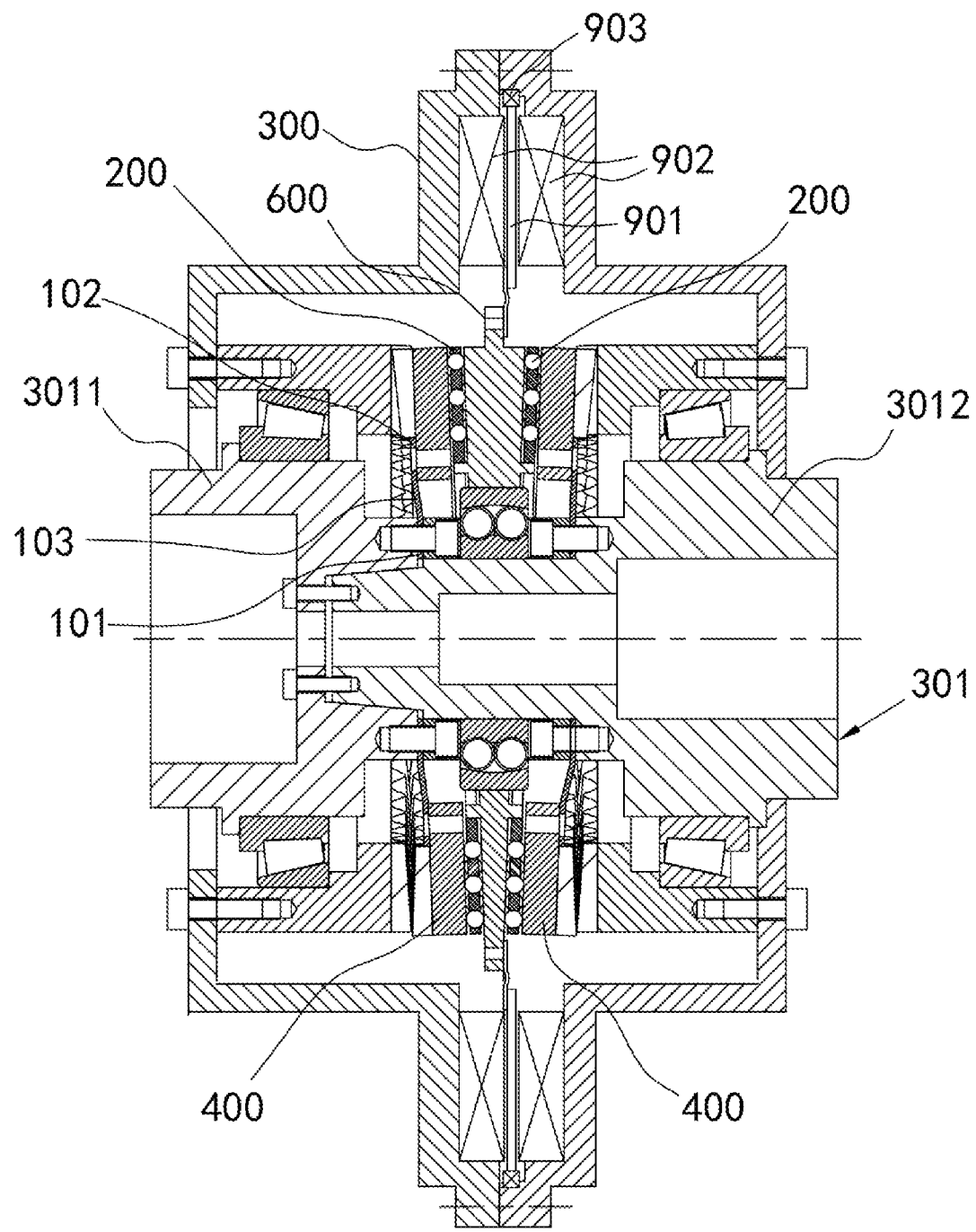
FIG. 2 shows a schematic diagram of the integral structure of a nutation reducer according to Embodiment 2 of the present disclosure.

Upon the basement of embodiment 1, as illustrated in FIG. 2, the driving mechanism is an electric motor directly driving the tilted disc 600 to rotate. The magnetic circuit of the electric motor adopts an axial layout, wherein the electric motor can be a disc-type hollow motor, whose rotor 901 is in a hollow structure form, and the inner annular part of the rotor 901 forms a flange, the flange being fixed to the excircle of the tilted disc 600 through the first annular spring film to avoid the axial floating of the tilted disc 600 interfering the rotor. Since the rotor does not involves the iron core to construct the inner magnetic circuit, its moment of inertia is greatly reduced, and it has a better dynamic response performance. The first bearing 903 is disposed between the excircle of the rotor and the inner surface of the case, and the stators 902 are disposed on opposite sides of the rotor, and fixed in the case 300. This layout can reduce the axial dimension of the nutation reducer.

Embodiment 3

Figure 3:
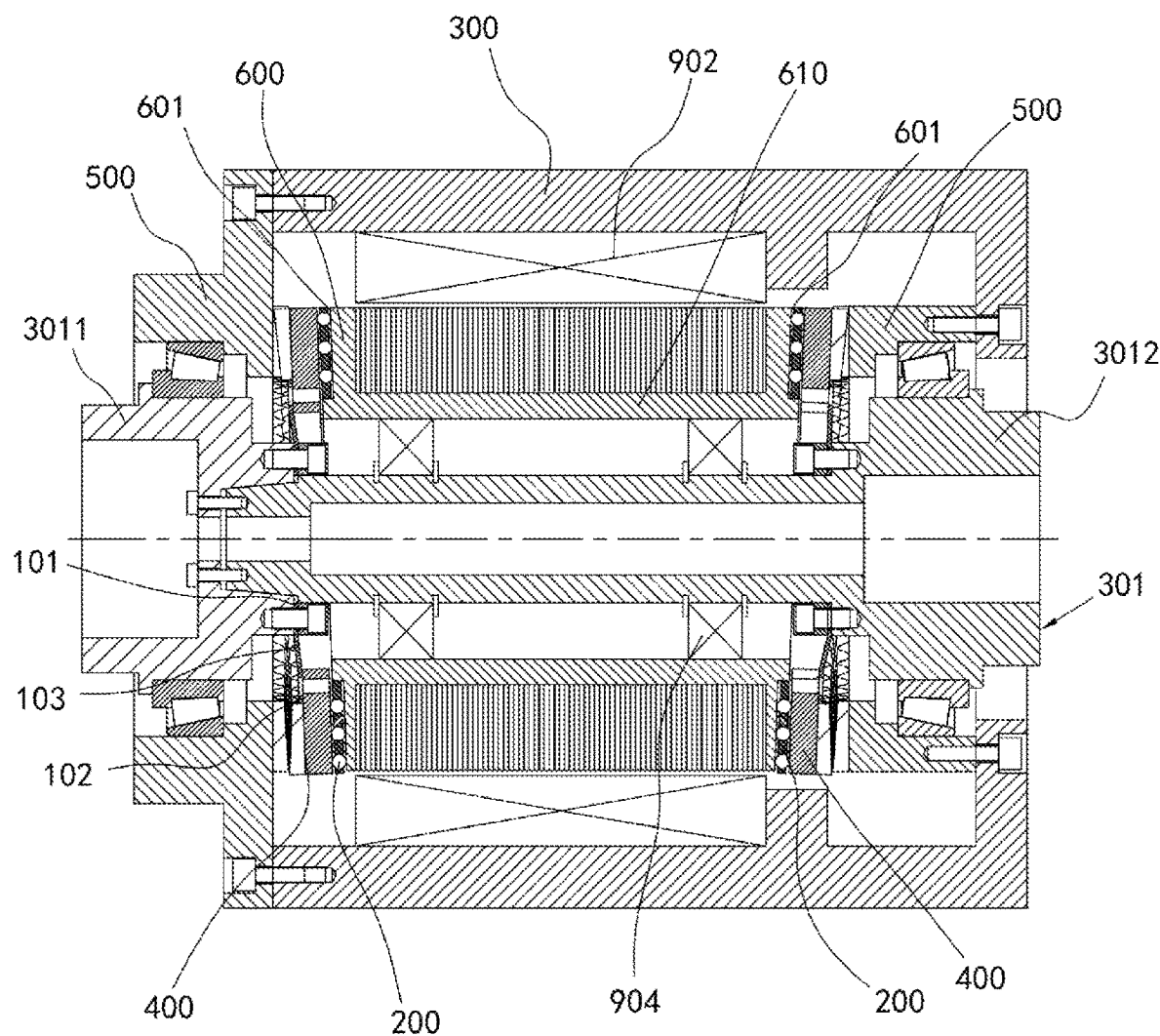
FIG. 3 shows a schematic diagram of the integral structure of a nutation reducer according to Embodiment 3 of the present disclosure.
Figure 4:
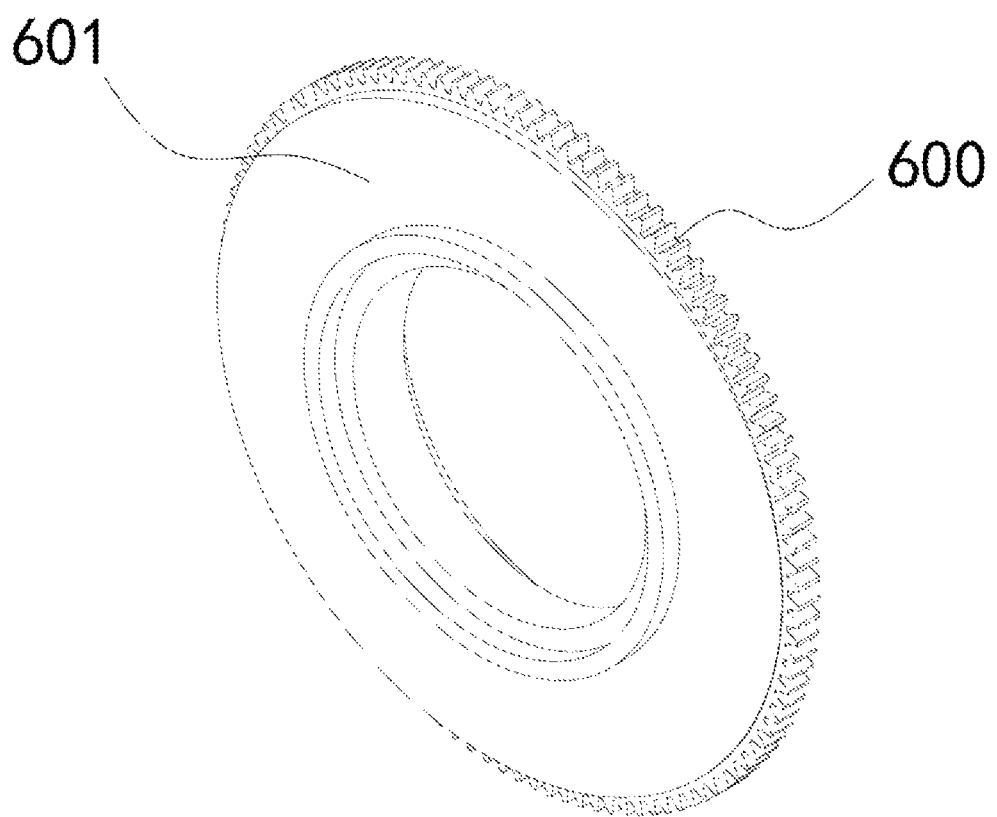
FIG. 4 is an isometric view of the tilted disc in FIG. 1 being used in embodiment 1 and 2.
Figure 5:
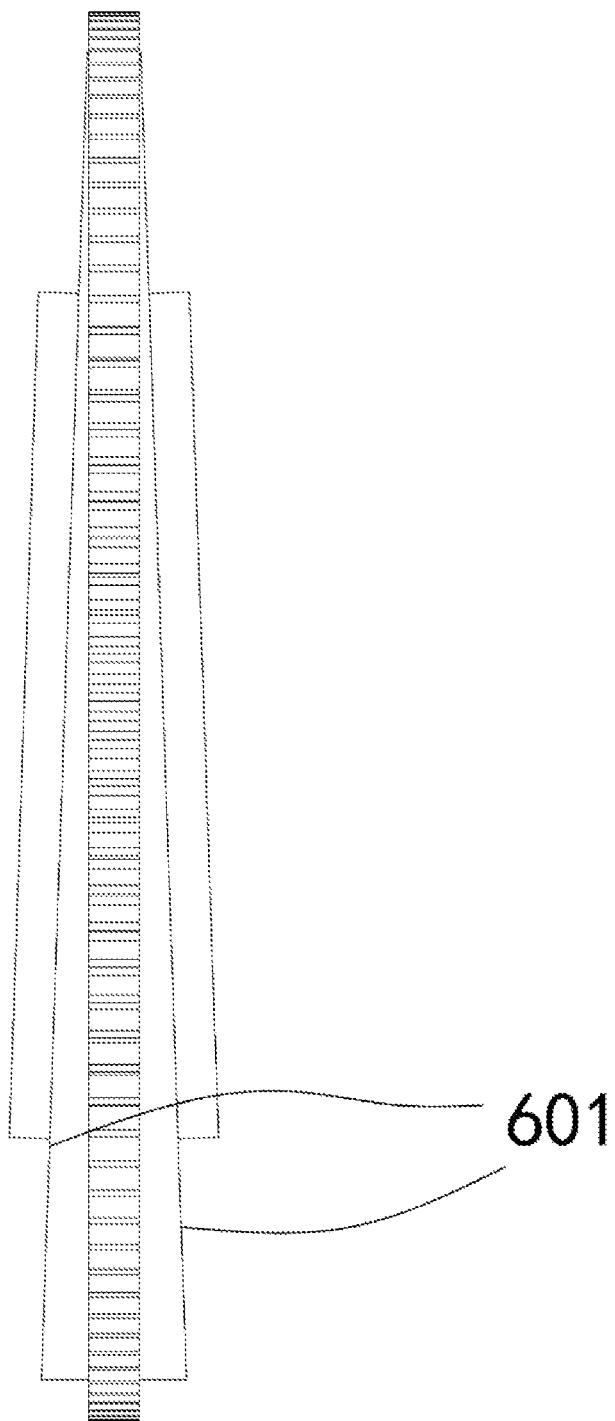
FIG. 5 is a front view of the tilted disc in FIG. 4.

Upon the basement of Embodiment 1, as illustrated in FIG. 3, the driving mechanism is an electric motor, directly driving the tilted disc 600 to rotate. The magnetic circuit of the electric motor is a traditional radial layout. The tilted disc 600 has a neck contraction segment 610, and two tilted planes 601 of the tilted disc 600 locate on both sides of the neck contraction segment 610. A through bore is coaxially formed in the tilted disc 600; a second bearing 904 is disposed on the cylindrical surface of the output shaft 301, and is mounted in the through bore of the tilted disc 600, such that the tilted disc 600 can rotate relative to the output shaft 301. Two second bearings 904 can be adopted to perform the function of radial positioning and bracing the tilted disc 600. The neck contraction segment serves as the rotor 901 of the electric motor, and the stator 902 of the electric motor is embedded in the case 300, to cooperates with the rotor 901.

Embodiment 4

Based on the above Embodiment 1, the driving mechanism involves an electric motor and a transmission mechanism, and the electric motor drives the tilted disc 600 through the transmission mechanism. Further preferably, the transmission mechanism comprises a chain and a chain wheel, and the chain wheel teeth are uniformly formed in the circumference of the tilted disc 600. The chain wheel is fixed to the shaft of the electric motor, and the chain wheel connects to the chain wheel teeth formed in the tilted disc 600 through the chain. Further preferably, the transmission mechanism comprises a transmission gear (pinion), and gear teeth are uniformly formed in the outer circumference of the tilted disc 600. The pinion is fixed to the shaft of the electric motor, engages the gear teeth on the tilted disc 600 to perform transmission.

Embodiment 5

Upon the basement of Embodiment 1, gear teeth are formed in the outer circumference of the said tilted disc 600, and the transmission mechanism can be a bevel gear pair, one bevel gear of which serves as a driving gear, driven by the electric motor, the other bevel gear of which serves as a driven gear, which is coaxially provided with a gear shaft. A cylindrical gear is provided on the gear shaft, and the cylindrical gear is in engagement with the gear teeth formed in the tilted disc 600. For this layout, the shaft angle between the shaft of the electric motor and the output shaft of the reducer is 90°, which can be used for the mechanical arm in a multi-axis manipulator, hiding the motor into the mechanical arm to drive the mechanical arm waving.

Embodiment 6

Figure 10:
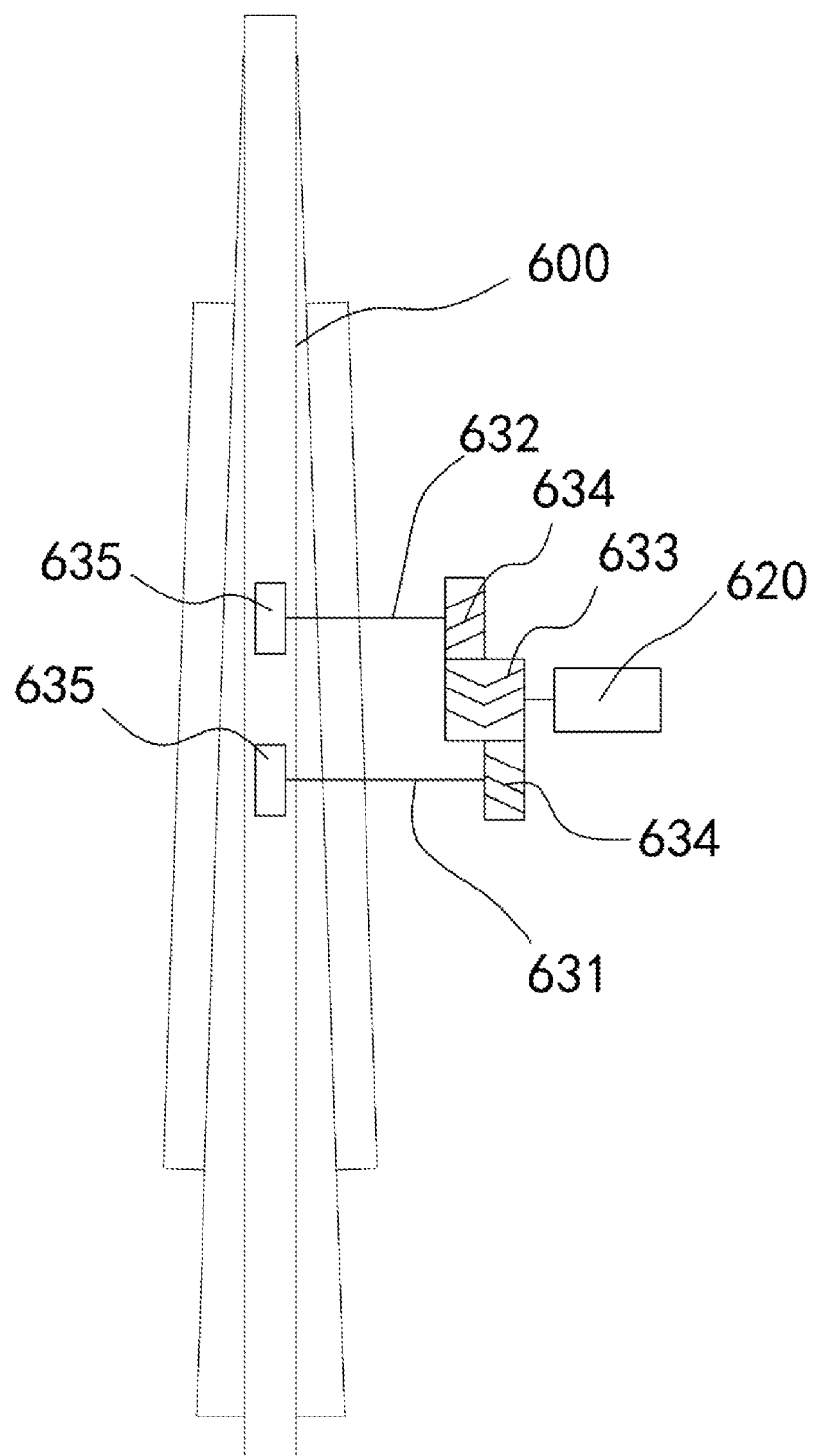
FIG. 10 shows a transmission connection diagram to driving the tilted disc of the nutation reducer in embodiment 1 of the present disclosure.

Upon the basement of Embodiment 1, as illustrated in FIG. 10, the driving mechanism involves a driving motor 620 and a transmission mechanism. The transmission mechanism comprises a first transmission shaft 631, a second transmission shaft 632, a herringbone gear 633, two helical gears 634 and two cylindrical gears (pinion) 635. One pinion 635 and one helical gear 634 are respectively fixed to the first transmission shaft 631 and the second transmission shaft 632. A round of gear teeth are formed in the outer circumference of the tilted disc 600, and the gear teeth engage with two pinions 635. The herringbone gear 633 is fixed to the shaft of the driving motor 620, and the two helical gears 634 individually engage with the herringbone gear 633. The hand of helix of the two helical gears are inverse with each other. The herringbone gear 633 engages individually with the two helical gears to realize power split and auto-even-load, then by means of the engagement between the two pinions and the gear teeth formed in the outer circumference of the tilted disc, the power converges to the tilted disc. Adopting power-split method can cut the thickness of the tilted disc to one half, so that the weight of the reducer can be decreased, and power density is improved.

In above embodiments 1-6, by means of adopting the tilted disc 600 with double tilted planes 601 and two nutation gears 400 symmetrically disposed in a reducer, power density of the reducer can be obviously improved, and friction loss of the bearings is reduced as well, and thus the transmission efficiency of the reducer is enhanced. This layout is specially suitable for reducers with double output ends, the nutation reducers used in DELTA manipulator, and each group of swinging arms need two output flanges. The nutation reducer in this embodiment has two output flanges (the output flange on the first output shaft 3011 of the reducer, and the output flange on the second output shaft 3012 of the reducer), can individually drive each swinging arm, getting a more compact structure, providing larger output torque and structure rigidity.

Based on any one of embodiments 1-6, further optionally, an opening (not illustrated) for dynamic balance of the tilted disc 600 can be formed in a side of the tilted disc 600 where the tilted disc 600 has a larger thickness to satisfy the necessary of dynamic balance of the tilted disc 600 when it rotates at high speed.

The foregoing specifically illustrates and describes exemplary embodiments of the present disclosure. It is to be understood that the present disclosure is not limited to the detailed structures, set-ups, or methods of implementation described herein; rather, the present disclosure is intended to cover a variety of modifications and equivalents that are within the spirit and scope of the appended claims.

The invention claimed is:

1. A nutation reducer, wherein the nutation reducer comprises:
    a case;
    two nutation gear pairs which are disposed in said case, wherein said nutation gear pair is composed of a nutation gear and a non-nutation gear in engagement, and said non-nutation gear is provided in said case in fixed manner or integrally formed with said case, a number of teeth of the nutation gear of said nutation gear pair being one more than that of said non-nutation gear;
    an output shaft of the reducer which is rotationally provided in said case;
    two pre-stretched annular spring films, which are respectively installed, on their respective sides, between the nutation gear and the output shaft of the reducer, to convert nutation movement of the nutation gear into single rotary movement of the output shaft of the reducer;
    wherein the annular spring film is further designed to be able to bear a radial force of the nutation gear, so as to enable the annular spring film to have a function of a joint bearing and have a centering function for the nutation gear;
    each of the annular spring films includes an inner ring, an outer ring, and an annular elastic portion connected to both the inner and outer rings;
    the annular elastic portion is an annular bulge which is convex in one side and concave in the other side;
    reamed holes are respectively distributed circumferentially in both inner and outer rings, and the nutation gear each is connected to the outer ring of said spring film by first hinged bolts which respectively pass through the reamed holes in said outer ring and fits with the reamed holes;
    said output shaft is fixed to the inner ring of said spring film by second hinged bolts, and said second hinged bolts respectively pass through the reamed holds in said inner ring and fit with the reamed holes;
    said inner ring is coaxially provided with said output shaft of the reducer, to which the inner ring is connected, and said outer rings are coaxially provided with said nutation gears, to which the outer ring is connected, each axis of the inner ring intersecting with that of the outer ring; and
    a shaft angle between the nutation gear and the non-nutation gear is less than 180°, and the annular elastic portion is capable of compensating a pre-stretched deformation amount of a tensile deformation amount generated during installation of the annular spring film; and
    a nutation generating mechanism disposed in said case, wherein the two nutation gear pairs are respectively arranged symmetrically on both sides of said nutation generating mechanism, and said nutation generating mechanism drives said nutation gears to perform the nutation movement, making the teeth of the nutation gear roll on the teeth of the non-nutation gear.

2. The nutation reducer as claimed in claim 1, wherein said nutation generating mechanism comprises:
    a tilted disc rotationally provided in said case on said output shaft, wherein two opposite sides of the tilted disc form a pair of symmetrically tilted planes, and said tilted disc is driven by an actuating mechanism; and
    planar high-density ball bearings, wherein the planar high-density ball bearing is interposed between the tilted disc and the nutation gear of the nutation gear pairs, and both sides of the tilted disc and the back side of each nutation gear in said gear pairs serve as raceways of said planar high-density ball bearing;
    wherein two nutation gears in two said nutation gear pairs have the same number of teeth, and the two non-nutation gears in two said nutation gear pairs have the same number of teeth, and
    when said tilted disc rotates, the tilted planes on both sides of the tilted disc drives the nutation gears to perform the nutation movement, making the teeth of the nutation gears roll on the teeth of the non-nutation gears.

3. The nutation reducer as claimed in claim 2, wherein the inner ring is tangent to an inner periphery of the annular elastic portion, while said outer ring is tangent to an outer periphery of the annular elastic portion.

4. The nutation reducer as claimed in claim 3, wherein a concave and convex surfaces of said annular bulge are annular ripple bulge formed by circular arc camber, spline surface or cosine surface.

5. The nutation reducer as claimed in claim 2, wherein an opening is formed in a side of said tilted disc where the tilted disc has a larger thickness to get dynamic balance when the tilted disc rotates.

6. The nutation reducer as claimed in claim 2, wherein said driving mechanism is an electric motor, directly driving said tilted disc.

7. The nutation reducer as claimed in claim 6, wherein said case serves as a case of said electric motor, in which a stator of said electric motor is embedded, and/or there is a neck contraction segment between the two tilted planes of said tilted disc, and said neck contraction segment serves as a rotor of said electric motor.

8. The nutation reducer as claimed in claim 2, wherein said driving mechanism includes both an electric motor and a transmission mechanism, and said electric motor drives the tilted disc through said transmission mechanism.

9. The nutation reducer as claimed in claim 8, wherein said transmission mechanism includes a transmission gear, and uniformly distributed gear teeth are made in a circumference of said tilted disc, wherein a gear is fixed to a shaft of the electric motor, and is in meshing engagement with the gear teeth in the tilted disc.

\* \* \* \* \*